(12) United States Patent
Klinemeier

(10) Patent No.: US 12,254,308 B2
(45) Date of Patent: Mar. 18, 2025

(54) SYSTEM, DEVICE AND/OR METHOD FOR UPDATING VEHICLE SUBSYSTEM CONFIGURATIONS

(71) Applicant: Mercedes-Benz Group AG, Stuttgart (DE)

(72) Inventor: Kevin Klinemeier, Seattle, WA (US)

(73) Assignee: Mercedes-Benz Group AG, Stuttgart (DE)

( * ) Notice: Subject to any disclaimer, the term of this patent is extended or adjusted under 35 U.S.C. 154(b) by 57 days.

(21) Appl. No.: 18/056,660

(22) Filed: Nov. 17, 2022

(65) Prior Publication Data
US 2024/0168747 A1    May 23, 2024

(51) Int. Cl.
G06F 8/65       (2018.01)
G06F 9/445      (2018.01)
H04L 67/12      (2022.01)
B60R 16/023     (2006.01)

(52) U.S. Cl.
CPC ............ *G06F 8/65* (2013.01); *G06F 9/44505* (2013.01); *H04L 67/12* (2013.01); *B60R 16/0231* (2013.01)

(58) Field of Classification Search
CPC ....... G06F 8/65; G06F 9/44505; H04L 67/12; B60R 16/0231
See application file for complete search history.

(56) References Cited

U.S. PATENT DOCUMENTS

| | | | | |
|---|---|---|---|---|
| 7,926,091 B2* | 4/2011 | Alrabady | ............... | H04L 63/12 701/115 |
| 9,043,078 B2* | 5/2015 | Johnson | ............... | G06F 11/0739 701/32.7 |
| 9,348,577 B2* | 5/2016 | Hoffman | ............. | G06F 11/1464 |
| 10,474,450 B1* | 11/2019 | Chim | ...................... | H04L 67/12 |
| 10,496,398 B2* | 12/2019 | Fox | ....................... | B60W 50/04 |
| 10,564,954 B2* | 2/2020 | Tillman | .................... | G06F 8/65 |
| 10,592,231 B2* | 3/2020 | Sakurai | .................... | H04L 67/34 |
| 10,599,418 B2* | 3/2020 | Kiyama | .................... | H04L 67/12 |
| 10,726,644 B2 | 7/2020 | Abari et al. | | |
| 10,735,260 B2* | 8/2020 | Maeda | .............. | H04L 12/40013 |
| 11,067,983 B2 | 7/2021 | Kentley-Klay et al. | | |
| 11,157,262 B2* | 10/2021 | Aiba | ......................... | G06F 8/65 |
| 11,354,114 B2* | 6/2022 | Ishikawa | .................. | H04L 67/34 |
| 11,743,525 B2* | 8/2023 | Rippe | ...................... | H04W 4/44 725/75 |
| 2010/0082702 A1* | 4/2010 | Ramanathan | .......... | G07C 5/008 707/17.005 |
| 2013/0145349 A1 | 6/2013 | Basak et al. | | |
| 2014/0282470 A1* | 9/2014 | Buga | ......................... | G06F 8/65 717/170 |
| 2015/0082297 A1* | 3/2015 | Parry | ........................ | G06F 8/65 717/173 |

(Continued)

OTHER PUBLICATIONS

International Search Report and Written Opinion for Application PCT/EP2023/025472, mailed Feb. 19, 2024, 15 pages.

*Primary Examiner* — Douglas M Slachta
(74) *Attorney, Agent, or Firm* — Dority & Manning, P.A.

(57) ABSTRACT

Example methods, apparatuses, and/or articles of manufacture are disclosed that may be implemented, in whole or in part, in connection with executing an update to a configuration of one or more vehicles deployed in the field. In one particular implementation, aspects of an updated configuration are to be determined "on the fly" responsive to a particular event.

20 Claims, 5 Drawing Sheets

(56) References Cited

U.S. PATENT DOCUMENTS

| | | | |
|---|---|---|---|
| 2016/0196132 A1 | 7/2016 | Searle et al. | |
| 2017/0108875 A1* | 4/2017 | Ross | G07C 5/008 |
| 2017/0344355 A1* | 11/2017 | Sarkar | G06F 8/65 |
| 2020/0159943 A1* | 5/2020 | Rocci | G06F 21/629 |
| 2020/0218531 A1* | 7/2020 | Kushwaha | G06F 8/66 |
| 2021/0011709 A1* | 1/2021 | Itatsu | B60R 16/02 |
| 2022/0004374 A1* | 1/2022 | Kamiguchi | G06F 8/65 |
| 2022/0121435 A1 | 4/2022 | Kreines et al. | |
| 2022/0126858 A1* | 4/2022 | Liu | B60W 60/001 |
| 2022/0179643 A1* | 6/2022 | Harata | G06F 8/65 |
| 2022/0334822 A1* | 10/2022 | Sakakibara | H04L 67/34 |

* cited by examiner

SYSTEM, DEVICE AND/OR METHOD FOR UPDATING VEHICLE SUBSYSTEM CONFIGURATIONS

BACKGROUND

1. Field

Subject matter disclose herein relates to subsystems of a motor vehicle that are configurable via an electronic communication network.

2. Information

Modern motor vehicles today are typically constructed for the integration of multiple subsystems manufactured by a variety of parties. Such subsystems may comprise or be embedded in, for example, electronic fuel injection devices, entertainment subsystems, climate control subsystems, brakes, door locks/windows, navigation systems, just to provide a few examples. Operation of such subsystems may be controlled, at least in part, by one more electronic control units (ECUs).

SUMMARY

One or more embodiments disclosed herein are directed to a vehicle configuration update system for managing vehicle configuration updates. The system (e.g., computing system) comprises: a communication device and one or more processors. The communication device may be configured to communicate with a communication network and with a vehicle via the communication network. The one or more processors are in communication with the communication device and are configured to perform a method, such as by executing instructions on a non-transitory computer-readable medium that is part of a controller or other article. The method can include: communicating, via the communication device and in response to an event, one or more update query messages to one or more subsystem configuration integrators, wherein each subsystem configuration integrator of the one or more subsystem configuration integrators is a service or module that controls a respective vehicle subsystem of multiple vehicle subsystems of the vehicle, and wherein the one or more update query messages are for querying whether the event is to cause at least one vehicle subsystem of the multiple vehicle subsystems to change operation of the at least one vehicle subsystem. The method may further include receiving, from the one or more subsystem configuration integrators via the communication device, one or more update determination messages for indicating whether the event is to cause at least one vehicle subsystem of the multiple vehicle subsystems to change operation of the at least one vehicle subsystem; generating configuration information for causing a new configuration to be applied to the vehicle, wherein the configuration information is generated based, at least in part, on the one or more update determination messages from the one or more subsystem configuration integrators, and wherein the updated configuration or replacement configuration information is for controlling operation of the multiple vehicle subsystems; generating, based on the configuration information, one or more configuration update messages that describe the updated configuration or replacement configuration information; and contemporaneous with the event, initiating transmission of the one or more configuration update messages through the communication device to the vehicle over the communication network to enable the vehicle to access at least a portion of the configuration information.

In one particular implementation, the event comprises receipt of one or more update request messages from the vehicle, wherein the one or more update request messages are for requesting the updated configuration or the replacement configuration information to be applied to the vehicle.

In another particular implementation, the event is an ignition event at the vehicle, such that at least one of the one or more update request messages from the vehicle is received responsive to the ignition event at the vehicle (e.g. a driver turning the key to start the car).

In another particular implementation, the configuration information is generated based, at least in part, on an identity of a driver of the vehicle. In yet another particular implementation, the configuration information is generated based, at least in part, on a model, trim, or year of the vehicle, and the one or more processors are configured to receive, from the vehicle via the communication device, one or more vehicle description messages that include parameters which are indicative of attributes of the vehicle, and are configured to determine the model, trim, or year of the vehicle from the parameters of the one or more vehicle description messages.

In yet another particular implementation, the vehicle configuration update request message indicates an event or condition that is triggering the requesting of the new vehicle configuration, wherein: the one or more processors are configured, in response to receiving the vehicle configuration update request message, to communicate one or more update query messages to the one or more computing devices operated by or associated with the one or more subsystem configuration integrators; and the one or more update query messages are associated with one or more of the multiple vehicle subsystems, and are for querying whether the event is to trigger the one or more vehicle subsystems to change their operation.

In an example, the one or more processors are configured to receive one or more query response messages from the one or more computing devices operated by or associated with the one or more subsystem configuration integrators. The one or more query response messages are for indicating whether the event or condition is to trigger the one or more vehicle subsystems to change their operation, and the configuration file or the one or more subsystem update request messages are generated based on the one or more query response messages.

In yet another particular implementation, the event comprises receipt of one or more key-value pairs from the communication network, and generating the configuration information further comprises: identifying subsystems of the vehicle based, at least in part, on the one or more key-value pairs; and generating the configuration information based, at least in part, on the identified subsystems of the vehicle.

In an example, identifying the subsystems of the vehicle further comprises: parsing the one or more key-value pairs into segments associated with the subsystems; and generating the configuration based, at least in part, on key-value pairs associated with the segments.

In yet another particular implementation, generating the configuration information further comprises: exchanging messages with computing devices associated with the one or more subsystem configuration integrators to obtain configuration parameters of subsystems associated with the one or more subsystem configuration integrators; and integrating the obtained configuration parameters of the subsystems associated with the one or more subsystem configuration integrators provide the configuration information.

In yet another particular implementation, at least one of the one or more transmitted configuration update messages comprises one or more universal resource identifiers accessible by a computing device co-located with the vehicle to obtain the at least a portion of the configuration information. In yet another particular implementation, operation of at least one of the one or more subsystems of the vehicle is controllable by one or more associated electronic control units (ECUs) within the vehicle, and wherein the generated configuration information comprises computer-readable instructions that are executable by at least one of the one or more associated ECUs. In yet another particular implementation, at least a portion of the configuration information comprises image and/or audio content.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
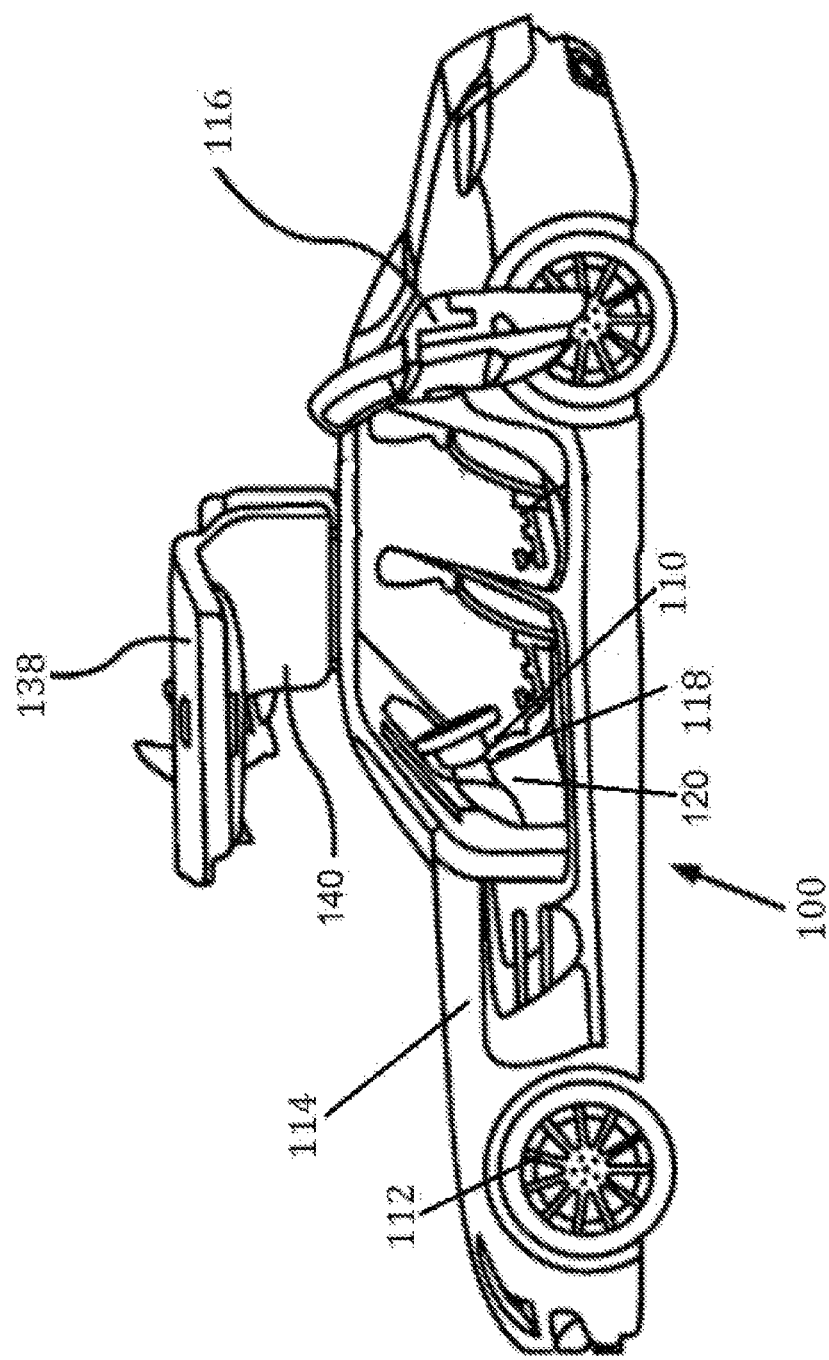
FIG. 1 is a schematic diagram identifying configurable subsystems of a vehicle, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Operation of subsystems of a vehicle is typically controlled by one or more electronic control units (ECUs) comprising embedded processors and/or controllers that behave based on and/or according to a particular "configuration." Such a configuration may be expressed, at least in part, by specific code (such as software/firmware routines), settings (such as control parameter values), or media content, just to provide a few examples. A configuration may apply to a particular vehicle subsystem, or apply to the entire vehicle, and may be used to control how the vehicle subsystem or how the entire behaves during its operation. Thus, a configuration of a vehicle may refer to a collection of code, settings, or other content that affect operation of the vehicle. A configuration of a vehicle subsystem may refer to a collection of code, settings, or other content which affect operation of the vehicle subsystem. Such content may be referred to as configuration content or configuration parameters.

In an embodiment, these configuration parameters or configuration content may be capable of being modified/adapted, so as to update a configuration that is implemented by these parameters/content. More particularly, such a configuration of a vehicle may be updated and/or replaced from time to time periodically and/or responsive to particular events, so as to replace an existing vehicle configuration with a new vehicle configuration. For example, a vehicle may communicate remotely with a server (e.g., wirelessly) to receive updated software/firmware routines, control parameters and/or media content to update a configuration and/or implement a "new configuration." In one implementation, a configuration of a vehicle subsystem may be implemented or embodied by configuration information, such as a configuration file, also referred to as a configuration file image. Such an image may comprise an electronic document and/or electronic file to be expressed as signals and/or states, and may be stored in a non-volatile memory device (e.g., formatted as one or more JavaScript Object Notation files) that is accessible by an ECU to control operation of the vehicle subsystem. The image may describe (also referred to as the image expressing) the configuration of the vehicle subsystem.

Particular embodiments disclosed herein relate to systems and methods that may enable updates to configurations of one or more vehicles in a fleet over an electronic communication network. As an example, one or more vehicles in a fleet of vehicles may be scheduled to receive a new and/or updated navigation service that is to be rolled out in a controlled fashion such that a small percentage (e.g., 1.0%) of a production fleet may be scheduled to receive the new and/or updated service before other vehicles in the production fleet. In another example, systems and methods described herein may enable an update to a configuration of a vehicle to address issues identified in a diagnostic operation and/or to meet government regulations. In another example, particular embodiments disclosed herein may enable a controlled configuration update for introducing new features of an autonomous/driverless driving system that permits adjustments to the new features for an entirety of a production fleet following data collected from operation of an initial feature roll out.

One technique for updating/replacing configurations of vehicles in a fleet may include maintaining prepared images (e.g., signals and/or states) in a memory (e.g., expressing updated software/firmware routines, control parameters and/or media content), and transmitting portions of such prepared images to vehicles to execute a configuration update. For different vehicles having different features, different years of manufacture and/or subject to different regulatory requirements, for example, a configuration update service may maintain a very large library of prepared images to effectuate associated configuration updates. Additionally, vehicle configuration features may be custom tailored not only for year, model and trim, but may be tailored for location, time of day, day of week, personal profile of driver/owner, just to provide a few examples of aspects that may be considered in determining an updated vehicle configuration. Thus, storing and/or maintaining prepared images for every possible configuration that may be applied for a particular fleet of vehicles would be virtually impossible.

According to an embodiment, a service to update a vehicle's configuration may, at and/or contemporaneous with the time of update, generate the vehicle's configuration dynamically or in other words "on the fly" based on attributes that distinguish the vehicle from other vehicles in a fleet. Such attributes distinguishing a vehicle within a fleet may comprise, for example, specific model, year, trim, prepaid upgrades, owner/primary driver attributes (e.g., associated with a user account), just to provide a few example of distinguishing attributes. In an implementation, such an update to a vehicle configuration may be generated and delivered on regular intervals and/or responsive to a particular event such as a request from a vehicle control system. Such dynamic generation of parameters for a vehicle's configuration update "on the fly" may enable greater flexibility to provide configuration updates that are tailored to unique aspects of particular vehicles, and avoid storing and/or maintaining prepared images or other pre-defined configuration information for every possible configuration that may be applied for a particular fleet of vehicles.

FIG. 1 is a schematic diagram identifying a few configurable subsystems of a vehicle 100, according to embodiments. As pointed out above, vehicle 100 may be constructed from or otherwise include subsystems that may include, e.g., a fuel injection subsystem having electronic fuel injection devices 114, entertainment subsystems 110, climate control subsystems 118, navigation subsystem 120, a braking subsystem having brakes 112, a door lock subsystem having door locks 116 and 138 and door windows 140, a wireless communication subsystem having a mobile data transceiver (not shown) and a wireless network transceiver (not shown), a telematic logging subsystem (not shown), just to provide a few examples. These subsystems may also be referred to as vehicle subsystems. As pointed out above, operation of such subsystems may be controlled, at least in part, by embedded ECUs in the vehicle.

According to an embodiment, an ECU controlling operation of a subsystem may comprise, for example, a microprocessor/microcontroller, non-volatile memory (e.g., flash memory) or other non-transitory computer-readable medium, and a bus to facilitate communication between and/or among such a microprocessor/microcontroller and non-volatile memory, and other devices. Functionality of such an ECU controlling operation of a subsystem may be defined, at least in part, by an associated subsystem configuration component. More specifically, the configuration of a vehicle subsystem may be defined by code, settings, or other content. This content may have different components, such as different pieces of code that implement different functions of the vehicle subsystem, different combinations of settings that control different features of the vehicle subsystem, or more generally different pieces of content that are combined to control operation of the vehicle subsystem. These different components may also be referred to as subsystem configuration components. A subsystem configuration component of such an ECU may include code and/or data, which may be expressed, at least in part, by signals and/or states stored and/or maintained in non-volatile memory to express and/or represent such code or data, such as executable and/or computer-readable instructions, media content (e.g., image and/or audio content), configurable control parameters, just to provide a few examples.

According to an embodiment, ECUs embedded in subsystems of vehicle 100 may be integrated to communicate with a main and/or host ECU to, for example, facilitate communication between and/or among ECUs of different subsystems, facilitate updates to subsystem configuration components stored in non-volatile memory devices, just to provide a few examples. In a particular implementation, such a main and/or host ECU may include one or more communication devices to communicate with entities external to vehicle 100 through a wireless communication network, for example. For example, such a main and/or host ECU may comprise one or more wireless transceiver devices capable of radio frequency (RF) and/or baseband processing to transmit messages to and receive messages from other devices on such a wireless communication network according to any one of several commercially available wireless communication protocols.

According to an embodiment, a main and/or host ECU may receive configuration information, such as a configuration file, which may include a configuration image expressed in signals and/or states, for use in updating subsystem configuration components for multiple subsystems of vehicle 100, such as in updating code or settings used in controlling operation of the subsystems. Main and/or host ECU may partition such a received configuration image into portions to be distributed on a bus/network to ECUs controlling operation of associated subsystems of vehicle 100. ECUs receiving such a distributed portion of the configuration image may update relevant portions of an associated subsystem configuration component stored in a non-volatile memory, for example. For instance, an ECU receiving a portion of the configuration image may use that portion to update the code executed by the ECU, and/or update a setting or other data used by the ECU. In a particular implementation, vehicle 100 may comprise one or more subsystems that are to operate under the control of associated ECUs dedicated to the subsystems.

According to an embodiment, a main and/or host ECU may exchange messages with another device via a wireless communication network to facilitate updates to subsystem configuration components of subsystems of vehicle 100

(e.g., subsystem configuration components of ECUs associated with such subsystems). In a particular implementation, a main and/or host ECU may receive one or more messages from a wireless network. These messages may include all or portions of files, code, content, parameters, etc. to be applied in updating subsystem configuration components of subsystems of vehicle 100. Such updates may occur, for example, responsive to a particular event and/or on preplanned update cycles.

Figure 2:
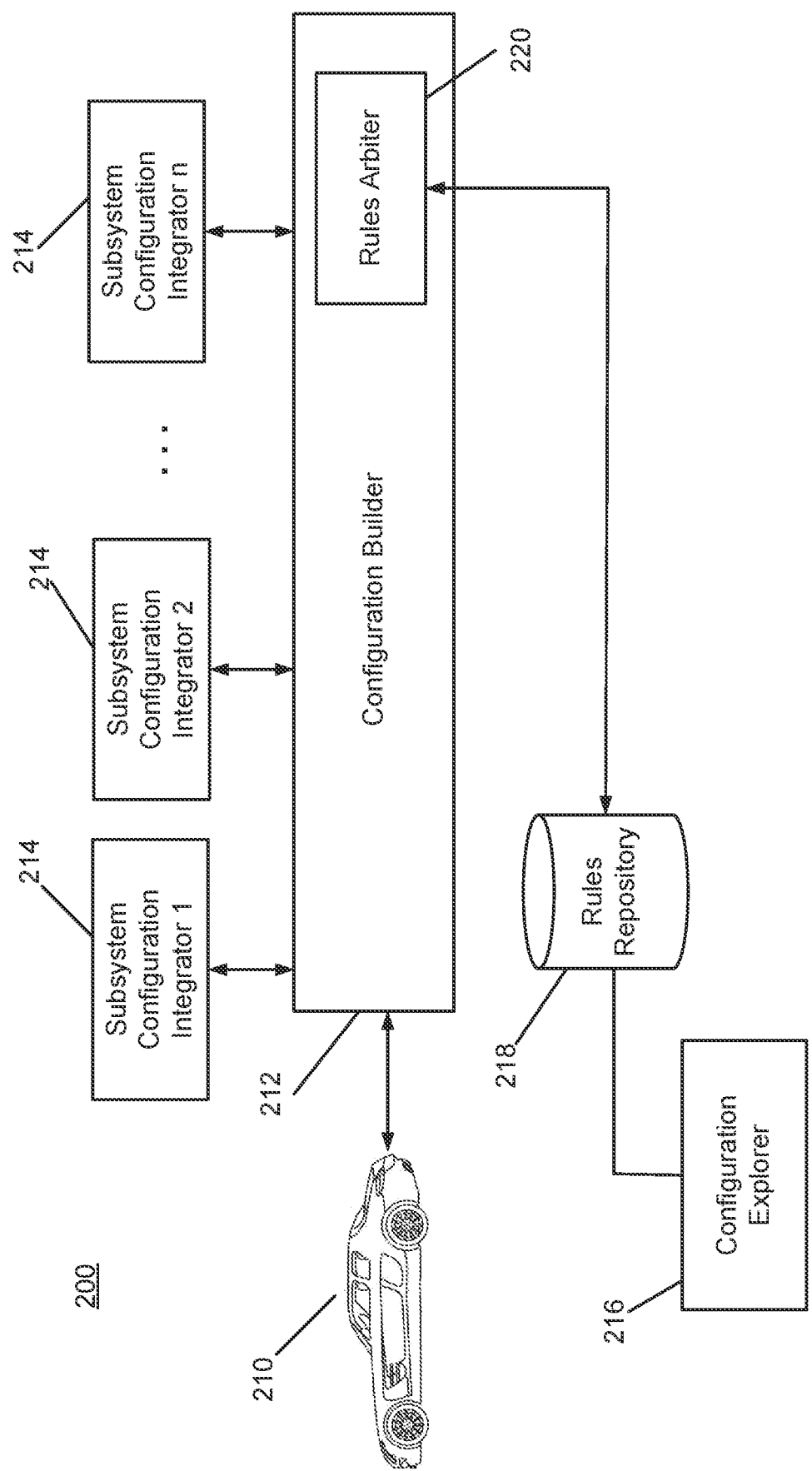
FIG. 2 is a schematic diagram of a system to update a vehicle configuration, according to an embodiment.

FIG. 2 is a schematic diagram of a system 200 to update a configuration of vehicle 210, according to an embodiment. The system 200 may include a vehicle 210, a configuration builder 212, and one or more subsystem configuration integrators 214. Vehicle 210 may implement features of vehicle 100 such as an integration of multiple configurable subsystems that operate under control of one or more ECUs.

The configuration builder 212 may form a vehicle configuration update system, which is discussed below in more detail. These components of system 200 may be in communication with each other via a communication network. More particularly, the configuration builder 212 may be able to wirelessly communicate with the vehicle 210, and to communicate with one or more computing devices that are operated by or otherwise associated with the subsystem configuration integrators 214. In this example, a configuration builder 212 may generate configuration information for update the configuration of the vehicle 210. The configuration builder 212 may be a computing system that comprises one or more computing devices, which may include one or more processors, and include non-transitory storage medium (also referred to as memory devices) that store instructions which are executable by the one or more processors. The computing system may exchange messages via a communication network with a host and/or main ECU of vehicle 210 to facilitate an update to a configuration of vehicle 210. According to an embodiment, configuration builder 212 may be controlled and/or operated by an automotive original equipment manufacturer (OEM) that integrates vehicle subsystems developed and/or manufactured by multiple subsystem configuration integrators 214.

In an embodiment, a subsystem configuration integrator may be an entity which supplies a vehicle subsystem to the automotive OEM. The subsystem configuration integrator may, e.g., manufacture and configure the vehicle subsystem. Subsystem configuration integrators 214 may comprise, for example, different divisions with an OEM manufacturing organization, and/or may comprise different outside vendors or suppliers. To communicate with the configuration builder 212, the subsystem configuration integrators may use computing devices, such as servers, which are operated, controlled (directly or indirectly), or more generally associated with the subsystem configuration integrators. These computing devices may communicate with the configuration builder 212.

In an embodiment, configuration builder 212 may be implemented in one or more computing devices arranged to operate as a server. In a particular implementation, configuration builder 212 may be hosted on one more servers maintained in a "cloud computing" system, wherein the one or more servers may communicate with the vehicle 210 and with other devices via the communication network. Such a computing system may include a communication device to communicate with the devices via the communication network, and may include one or more processors that are configured to perform various operations, such as the steps illustrated in FIG. 4. The computing system may facilitate the updating of a vehicle's configuration, and thus may be referred to as a vehicle configuration update system.

According to an embodiment, configuration builder 212 may determine, identify, or select portions of a configuration image or other configuration file to be applied in updating and/or replacing a configuration of vehicle 210. The selected portion may be determined, identified, or selected based, at least in part, on features and/or attributes specific to vehicle 210 (e.g., model, year, trim) and/or situational factors (e.g., location, time of year, day of week, etc.).

As pointed out above, all or a portion of a configuration image to be applied in updating and/or replacing a configuration of one or more subsystems of vehicle 210 may be created and/or updated from time to time (that is, periodically) and/or responsive to particular events (e.g., responsive to communications between vehicle 210 and a remote server to request updated software/firmware routines, control parameters, and/or media content to update a configuration).

In one example, such a configuration image or other configuration information (or portion thereof) may be created and/or updated to update and/or replace a configuration of a single subsystem of vehicle 210. In other words, the configuration image or other configuration information may be updated so as to provide a new configuration for the subsystem. In another example, such an image (or portion thereof) may be created and/or updated to update and/or replace a configuration of multiple subsystems of vehicle 210. In other words, the configuration image may be updated so as to provide new configurations for multiple subsystems.

In a particular implementation, configuration builder 212 may be adaptable to create and/or update the configuration information (e.g., a configuration image) based, for example, on particular conditions and/or events, so as to provide a single subsystem and/or multiple subsystems with a new configuration.

In an implementation, configuration builder 212 may determine, identify, or select configuration information, such as portions of a configuration image to be applied in updating a configuration of vehicle 210, based, at least in part, on interactions (e.g., an exchange of messages) with subsystem configuration integrators 214. For example, configuration builder 212 may exchange messages with a particular subsystem configuration integrator 214 to obtain an update of a component of a configuration associated with the particular subsystem configuration integrator 214 (e.g., subsystem configuration component). In one example, the subsystem configuration integrator 214 may be a vendor of a door locking subsystem. In this example, the configuration builder may exchange messages with the subsystem configuration integrator 214 to update a configuration of the door locking subsystem. The update of the configuration of the door locking subsystem may comprise, e.g., updated software/firmware to conform the door locking subsystem to new regulations, for example.

In this example, configuration builder 212 may transmit one or more messages to the particular subsystem configuration integrator 214 associated with the door locking subsystem. More specifically, the messages may be transmitted to a computing device operated by or associated with the subsystem configuration integrator. The one or more messages transmitted to the subsystem configuration integrator may include a subsystem update request message that requests, for example, a portion of a configuration update associated with the door locking subsystem (e.g., subsystem configuration component) manufactured and/or serviced by the particular subsystem configuration integrator 214. In an embodiment, such a request from the update request message may comprise an indication of a particular subsystem and/or attributes of vehicle 210. In an implementation, such a request may also consider, include, or account for rules maintained in rules repository 218. In this example, the rules may be based, for example, on safety and/or regulatory rules to ensure proper operation of vehicle 210.

In this example, the particular subsystem configuration integrator 214 may then respond to the subsystem update request message with a subsystem update response message. The response message may include configuration information, such as an image of signals and/or states, or other content for updating operation of a vehicle subsystem associated with the subsystem configuration integrator 214. In some instances, the configuration information may include a subsystem update module, which is discussed below in more detail. This configuration information may be combined with other components of an updated configuration to form a configuration file, and may be transmitted by the configuration builder 212 to a host and/or main ECU of vehicle 210.

In one embodiment, configuration builder 212 may communicate a vehicle ID to a subsystem integrator 214, and may receive a key-value pair back in response. The key-value pair may relate to an operation of an associated subsystem of the subsystem integrator 214. In another embodiment, configuration builder 212 may present or otherwise communicate a query (e.g., according to an SQL or SQL-like format) to the subsystem configuration integrator 214. The query may include an update query message specifying certain essential attributes (but not necessarily all attributes) of a vehicle. These attributes may be sufficient to enable the subsystem configuration integrator 214 to generate an image, file, or other configuration information for carrying out an update and/or replacement of at least a portion of a configuration. That is, the configuration information generated by the integrator 214 may be used to implement or manifest a new configuration for a vehicle subsystem associated with the integrator 214.

In an embodiment, to obtain such attributes of vehicle 210, configuration builder 212 may interact with a separate service (e.g., a web service). In a particular implementation, configuration builder 212 may separately provide an identifier (e.g., VIN) via a query to an extrinsic service (e.g., "capabilities" service, not shown), so as to obtain various attributes of vehicle 210. The extrinsic service may respond to the query, also referred to as a vehicle attribute query, with various attributes of vehicle 210. Such a query may include an attribute query message, which may be formatted as an SQL query/request at least in part as "capabilities·vin={request·vin}, GET capabilities·model, capabilities·year", for example. It should be understood, however, that this merely an example of how configuration builder 212 may request and/or obtain attributes of vehicle 210 for use in communicating with subsystem configuration integrators 214 (e.g., to obtain updated subsystem configuration components).

In a process to obtain a new configuration for vehicle 210, configuration builder 212 may exchange messages with multiple subsystem configuration integrators 214. The new configuration may be an updated configuration or a replacement configuration. These messages may be to obtain associated subsystem configuration components (e.g., obtain updated code or updated settings) to be combined and/or integrated to provide the new configuration. For example, the configuration builder 212 may obtain or otherwise receive a first subsystem configuration component, a second subsystem configuration component, a third subsystem configuration component, etc. In this example, the various subsystem configuration components may be received from different subsystem configuration integrators, respectively, such as a first subsystem configuration integrator, a second subsystem configuration integrator, and a third subsystem configuration integrator, etc.

According to an embodiment, a new configuration for vehicle 210 may be constrained by one or more rules maintained in rules repository 218. For example, the configuration builder may obtain, from two subsystem configuration integrators, two respective subsystem configuration components that would form an updated configuration for vehicle 210. These two subsystem configuration components may, however, conflict with each other if they are not integrated properly. In one particular example, such a conflict may arise if subsystem configuration components of two interrelated subsystems (e.g., from different subsystem configuration integrators 214) are incompatible and/or violate a government regulation. In integrating these subsystem configuration components of an updated configuration, configuration builder 212 may include or execute a rules arbiter 220 to resolve any conflicts between and/or among subsystem configuration components obtained from subsystem configuration integrators 214.

According to an embodiment, different subsystem configuration integrators 214 may be dedicated to and/or may specialize in maintaining and/or servicing specific associated subsystems of vehicle 210. For example, one subsystem configuration integrator 214 may specialize in maintaining and/or servicing a climate control subsystem of the vehicle 210, and another subsystem configuration integrator 214 may specialize in maintaining and/or servicing an entertainment subsystem of the vehicle 210. In this example, yet another subsystem configuration integrator 214 may specialize in maintaining and/or servicing a door lock subsystem having a door lock mechanism. In the particular implementation of system 200, features to be implemented in or manifested by subsystem configuration components of subsystems manufactured and/or serviced by subsystem configuration integrators 214 may rapidly evolve. In other words, the operation or features of a particular vehicle subsystem may have to be updated rapidly. This need for rapid update may be due at least in part to many triggering factors, such as performance upgrades, content refresh, discovery of defects (e.g., software bugs), reliability improvements, changes in government regulations, just to provide a few examples of how/why features of a subsystem configuration component may change. Tracking all of these triggering factors for many different vehicle subsystems, and generating configuration information for updating the configuration of all these vehicle subsystems may be very time-consuming and resource-intensive. Thus, centralizing an ability to entirely create updated subsystem configuration components for many different vehicle subsystems with configuration builder 212 may be infeasible or impractical. As a result, it may be more practical and feasible to have individual subsystem configuration integrators 214 perform the updating of essential features of subsystem configuration components associated with the respective subsystem configuration integrators 214 associated with these configuration components. For example, the configuration builder 212 may rely on individual subsystem configuration integrators to generate subsystem update modules, which are discussed below, for their updating their own associated vehicle subsystems.

Figure 3:
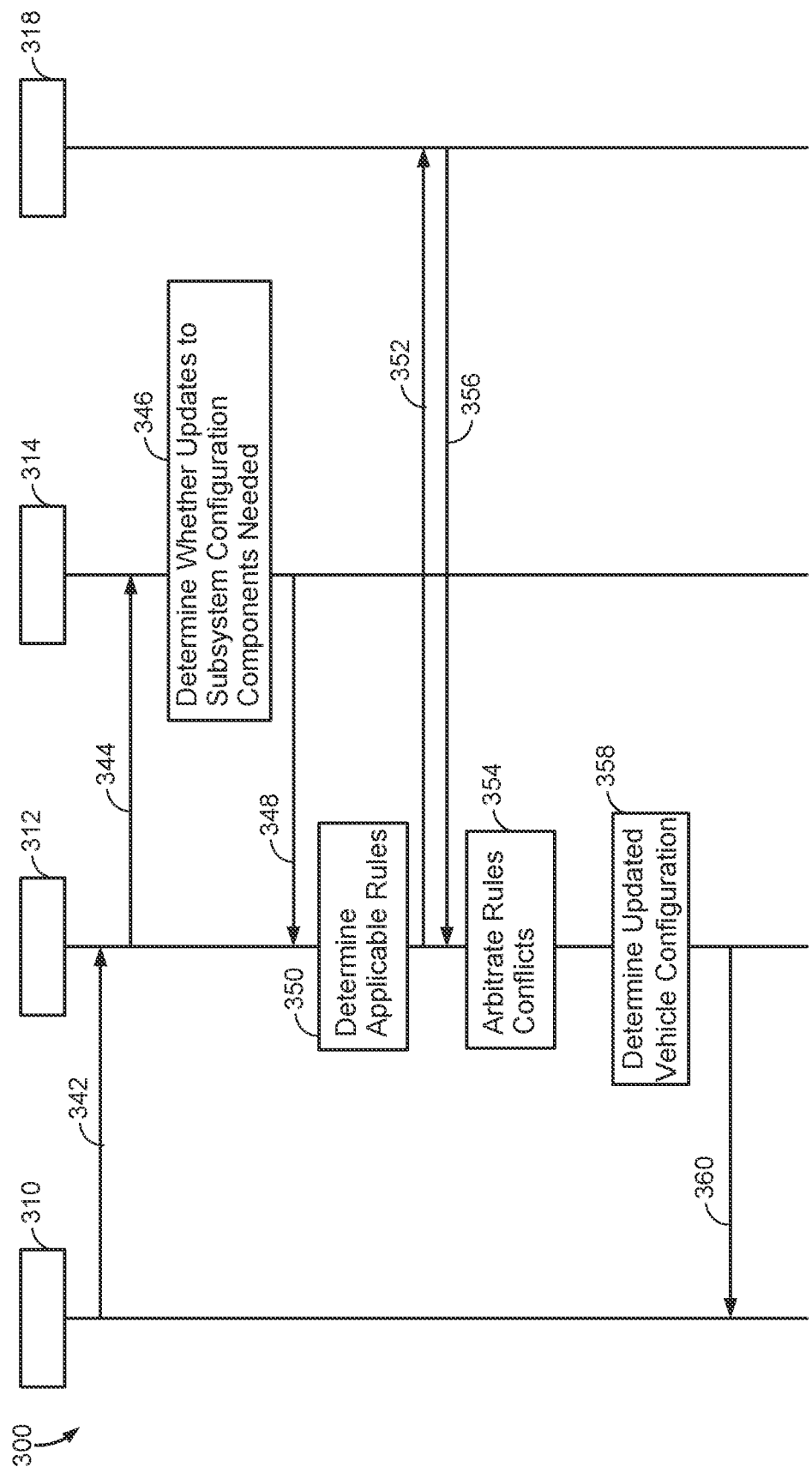
FIG. 3 is a message flow diagram illustrating communication between and/or among entities for updating a vehicle configuration, according to an embodiment.

As pointed out above, a service may determine updates to a vehicle's configuration at initiation of an update process, and generate an image, file, or other configuration information to be applied in updating the vehicle's configuration, wherein the configuration information may be dynamically generated "on the fly" based, at least in part, on attributes that distinguish the vehicle from other vehicles in a fleet. FIG. 3 is a message flow diagram illustrating communication between and/or among entities for determining an updated configuration of a vehicle 310 responsive to an event, according to an embodiment. Such an event may comprise transmission of a message 342 to configuration builder 312 requesting an updated configuration. The message 342 may also be referred to herein as a vehicle configuration update request message.

In an embodiment, transmission of message 342 may be triggered by any one of several conditions and/or events including, for example, an ignition of vehicle 310, change in a geo-fenced location of vehicle 310, a request from an update scheduler, a backend software update, just to provide a few examples. Such a backend software update may enable a cautious rollout of access to a new version of a backend service (e.g., where initially only a few vehicles in particular regions are enabled to connect to the new version) followed by a rollout of access to an expanded cohort of vehicles. Such a backend software update may be part of a general/global software update, or part of a software update executed at a node of a federated learning system, for example.

According to an embodiment, configuration builder 312 may process contents of message 342 to, for example, determine attributes of vehicle 310 such as specific model, year, trim, prepaid upgrades, as well as other contextual attributes such as location or identity of a driver (e.g., if there are multiple drivers associated with vehicle 310), just to provide a couple examples of contextual attributes. In one particular implementation, message 342 may include a unique identifier that is referenced to vehicle 310, enabling configuration builder 312 to determine attributes of vehicle 310 by accessing a database or other data repository.

In an embodiment, message 342 may also include a namespace that may be parsed into segments by configuration builder 312 for identifying subsystems for which an updated configuration is requested. In a particular implementation, parsed segments of such a namespace may comprise key-value pairs. The configuration builder 312 may associate the key-value pairs with particular such identified vehicle subsystems and/or one or more subsystem configuration integrators 314, wherein such subsystem configuration integrators 314 are to provide updated subsystem configuration components for such identified vehicle subsystems. According to an embodiment, a namespace in a request of a message 342 may comprise a concatenation of characters. The namespace may indicate a base configuration as a tree of key-value pairs that may be overridden subject to applicable rules and/or discovered conflicts. In a particular implementation, such key-value pairs in a namespace may be formatted according to JavaScript Object Notation (JSON) (see, e.g., IETF RFC 8259), for example. In another implementation, another 'line level' data format (e.g., JSONb or google protocol buffers, etc.) may be implemented for enhanced efficiency while enabling client and/or backend processes to employ natural language processing of the message 342. In one example, the message 342 may contain, for example, service endpoints, timeout/retry periods, debug/logging flags, or other items that may be transported in a message formatted for JSON and transmitted according to an associated communication protocol.

In some instances, the vehicle 310 may transmit the vehicle configuration update request message 342 responsive a geofence event to disable a service that is not legal in a particular area (e.g., a payload of the request message includes enabled/disabled flags). In another example, such a request message 342 may request a service activation (e.g., for updates initiated/executed by a backend server) which may, for example, be accompanied with payment for the service activation.

In the example of FIG. 3, after the configuration builder 312 processes the configuration update request message 342, the configuration builder 312 may then transmit one or more messages 344 to one or more subsystem configuration integrators 314 requesting updates to components of a configuration for vehicle 310 for associated subsystems. More specifically, the messages 344 may be transmitted to one or more servers or other computing devices operated by or otherwise associated with the subsystem configuration integrators 314. The messages 344 may also be referred to herein as subsystem update request messages. That is, the configuration builder 312 may transmit or otherwise communicate a subsystem update request message 344 to a particular subsystem configuration integrator 314. The message 344 may request content, or more specifically configuration information for updating operation of the vehicle subsystem associated with the integrator 314. For example, the content being requested may include updated code or updated settings, which would update a configuration component for a vehicle subsystem associated with the integrator 314.

As pointed out above, configuration builder 312 may determine content of requests in messages 344 based on rules accessed from a rules repository (e.g., rules repository 218) that may constrain particular features of a subsystem configuration component of an updated configuration. For example, messages 344 may indicate one or more restrictions and/or constraints to be incorporated in a requested update of a subsystem configuration component.

According to an embodiment, configuration builder 312 may determine updated configurations targeted to specific functions of a target vehicle model and year. In one aspect, configuration builder 312 may access one or more backend and/or extrinsic sources (not shown) to obtain configuration sets that are identifiable according to a particular definition language. For example, such configuration set may be accessible according to an SQL query such as in the following example:

"'sql
From devcap, vvr where devcap.navEnabled=true and vvr.modelYear>=2021
'"

According to an embodiment, a configuration set may be obtained based on responses from multiple SQL queries. As stated above, configuration components may conflict with each other. The configuration builder 312 may execute, at block 350 of FIG. 3, an operation for determining applicable rules for resolving conflicts. At block 354, the configuration builder 312 may use the rules to arbitrate conflicts. For example, if conflicting queries provide a "true" result, then a particular request to update the vehicle 310's configuration may be associated with configuration components that conflict with each other. In that example, configuration builder 312 may apply a priority and/or chain-of-command technique at block 354 to resolve conflicts. Resolution of such a conflict may be executed according to one or more rules. One example of such a rule may specify a timeout for waiting for an acknowledgement and/or response to a message. While a default value for such a timeout may be 30 seconds, a rule may specify that if a particular vehicle 310 is located in Japan, a value for such a timeout is to be set to 45 seconds (e.g., to allow for messages to cross the Pacific). Another example of such a rule may specify that for a particular vehicle, a timeout for waiting for an acknowledgement and/or response to a message should have been two minutes (e.g., to enable debugging and/or troubleshooting some problem/malfunction).

As illustrated in FIG. 3, responsive to one or more subsystem update request messages 344, a subsystem configuration integrator 314 may prepare an update to one or more subsystem configuration components for an updated configuration at block 346, wherein the updated configuration is associated with one or more subsystems of vehicle 310. As pointed out above, such a subsystem configuration component of an updated configuration may comprise configuration information, which may include signal and/or states of a configuration image (e.g., instructions, media content and/or configurable control parameters). The configuration image may be stored in a non-volatile memory device local to an ECU that is to control operation of an associated subsystem. In an embodiment, the update may be expressed as a subsystem update module, which may be a piece of content (e.g., a package) that includes code and/or settings for updating the operation of the associated subsystem. Such an update to a subsystem configuration component determined at block 346 may then be transmitted back to configuration builder 312 in one or more messages 348. The messages 348 may also be referred to as subsystem update response messages. In one implementation, message 348 may comprise one or more links and/or URIs to access modules, or may include the modules themselves, that are to be integrated to provide an image or other file for use in updating associated subsystem configuration components.

In one particular implementation, if configuration builder 312 is to initiate transmission of messages 344 to multiple different subsystem configuration integrators 314, configuration builder 312 may transmit multiple messages 344 to multiple different subsystem configuration integrators 314 concurrently. In another particular implementation, configuration builder 312 may transmit multiple messages 344 to different subsystem configuration integrators 314 one at a time. Such a sequential transmission allows for the configuration builder 312 to initiate transmission of a first message 344 to a first subsystem configuration integrator 314, and to receive a message 348 from the first subsystem configuration integrator 314 containing an updated subsystem configuration component for a first vehicle subsystem prior to transmitting a second message 344 containing a request for an updated subsystem configuration component for a second vehicle subsystem. This may, for example, enable configuration builder 312 to tailor a request in the second message 344 for an updated subsystem configuration component for the second vehicle subsystem based, at least in part, on an updated subsystem configuration component for the first vehicle subsystem received in the first message 348. A subsystem configuration components in these examples may be updated by, e.g., a subsystem update module which include updated code and/or updated settings for updating existing code and/or settings of the subsystem configuration component. The updated subsystem configuration component may lead the associated vehicle subsystem to have an updated operation.

As stated above, the configuration builder 312 may determine whether different subsystem configuration components, which are for updating different vehicle subsystems, would conflict and/or violate any implementation rules. Such a determination may be based, at least in part, on updates to subsystem configuration components received in one or more messages 348 (e.g., based on messages from different source subsystem configuration integrators 314). Here, configuration builder 312 may determine any applicable rules at block 350 (e.g., by accessing a rules repository such as rules repository 218). The configuration builder 312 may then communicate with a rules repository 318 (which may be an embodiment of rules repository 218) to resolve the conflicts. For example, the configuration builder 312 may, at block 350, determine rules with which the configuration of the vehicle or the vehicle subsystems needs to comply. The configuration builder 312 may then communicate, in message 352, parameters of updated subsystem configuration components to rules repository 318 to identify and/or resolve any conflicts and/or rules violations. The rules repository 318 may communicate, back to the configuration builder 312, a message 356 that may provide indications of conflicts and/or rule violations (or an indication of no conflicts or rule violation).

The configuration builder 312 may incorporate the indication provided by message 356 into how it generates configuration information, or more specifically a configuration file, for an updated configuration. More particularly, the configuration builder 312 at block 358 may determine/define an updated vehicle configuration based on the indication in message 356.

In an embodiment, determining the updated vehicle configuration at block 358 may comprise packaging updates to subsystem configuration components as a concatenation of updated modules of subsystem configuration components. In other words, the configuration builder 312 may generate a configuration image or configuration file based on subsystem update modules what are included in messages 348 from the subsystem configuration integrators. This concatenation of modules may be encapsulated in signal packets to be transmitted to vehicle 310. In one implementation, updated modules may be transmitted in one or more messages 360 (e.g., in a TCP/IP session). The messages 360 may be used to update a vehicle configuration for the vehicle 310, or more generally to provide the vehicle 310 with a new vehicle configuration, and may also be referred to as a configuration update message. In another implementation, one or more transmitted messages 360 may contain one or more URIs/ links enabling vehicle 310 to download updated modules from a server (not shown). A main and/or host ECU at vehicle 310 may then extract updated modules of subsystem configuration components from received signal packets to be used in updating subsystem configuration components of associated subsystems of vehicle 310.

In one aspect, vehicle 310 may comprise one or more computing devices configured as a "client" device, while configuration builder 312 may comprise one or more computing devices configured as a "server device." In one example, vehicle 310 may implement a "cloud gateway" and identify itself as such to configuration builder 312. For example, in addition to providing a namespace of a configuration being requested, message 342 may forward a unique identifier associated with vehicle 310. Response message 360 may comprise caching information and a configuration tree. Such a configuration tree may comprise an arbitrary number of nodes (e.g., up to a maximum size) specifying a requested configuration update. In one embodiment, exchange of messages 342 and 360 may be at least in part carried out according to a hypertext transfer protocol (HTTP) implemented with caching tools and software known to those of ordinary skill in the art. In another embodiment, exchange of messages 342 and 360 may be at least in part carried out according to a message queuing telemetry transport (MQTT) protocol. According to an embodiment, message 342 transmitted according to HTTP may be authenticated using a mutual transport layer security (mTLS) process and may be formatted as an HTTP GET message. A message 342 transmitted according to MQTT may be authenticated using commercially client authorization techniques. According to an embodiment, configuration builder 312 may validate that a value for {UID} in message 342 matches a user identifier in a client certificate and honor a so-called "if-modified-since" header. If configuration builder 312 determines that a particular configuration presently determined at block 358 is the same as a configuration at "{expiration}," configuration builder 312 may return a response in message 360 that indicates "no changes" instead of an entire payload including the configuration to facilitate efficient use of communication network resources.

In an implementation, transmission of message 342 according to MQTT may result in publication to topics (e.g., referred to as "subjects"). In one example, transmission of a message 342 according to MQTT by vehicle 310 may result in publication of a message containing a current radio station to an associated topic as "/car/{carID}/entertainment/radio." In another example, transmission of a message 360 according to MQTT by configuration builder 312 may result in publication to an associated topic as "/car/{carID}/config/{domain}."

According to an embodiment, a namespace specified in an HTTP GET message may express unique configuration elements to enable avoidance of collisions. In one example, namespaces in the following two different HTTP GET messages (for "networking" and "navigation" subsystems) may include "retry-period" parameters that return different values.

As shown in the above example, modules for an updated configuration may be obtained by vehicle 310 through accessing a universal resource identifier (URI) embedded in a payload of a message 360. Such an embedded URI may be associated with its own caching infrastructure. In another particular implementation, such a URI may be embedded in an MQTT response message. In yet another particular implementation, a JSON structure may be swapped out with a different type of document to include an embedded URI.

According to an embodiment, while configuration builder 312 may receive some parameters specifying a request for a configuration to be updated in an HTTP GET message in a message 342, configuration builder 312 may access backend/extrinsic sources (not shown) to obtain additional information from which to determine an updated configuration for a particular vehicle. In a particular example, configuration builder 312 may obtain parameters from an HTTP GET message in a message 342 (e.g., VIN) to query such backend/extrinsic sources to obtain additional information (e.g., from a subsystem configuration integrator 314).

According to an embodiment, a configuration of vehicle 310 may be updated on a schedule or responsive to particular events. For example, vehicle 310 may transmit a message 342 requesting an updated configuration periodically (e.g., daily, weekly monthly). In another example, vehicle 310 may transmit a message 342 requesting an updated configuration responsive to a particular event such as, ignition of vehicle 310 and/or other explicit user input (e.g., selection at a console or mobile application). In a particular implementation, an update of configuration of vehicle 310 may be tailored for particular drivers and/or users (e.g., determined immediately prior to transmission of a message 342). Here, to enable a tailoring of a configuration of vehicle 310 for a particular driver and/or user, an HTTP GET message in message 342 may further include an identifier of a driver and/or user for which a requested configuration update is to be tailored. In another implementation, an updated configuration from configuration builder 312 may anticipate multiple different contexts for different users and/or drivers and adapt accordingly in real-time.

As stated above, transmission of message 360 may involve message caching. According to an embodiment, message caching may be defined, at least in part, by a server implemented at configuration builder 312 to enable a reduction in a number of changes in clients implemented at vehicle sides. An HTTP client implemented at vehicle 310 may include no cache-control headers. For network efficiency, an 'if-modified-since' header may be used. An implementation of message 342 according to an MQTT request structure may include an if-modified-since header with no other cache directives.

According to an embodiment, configuration builder 312 may provide an updated configuration for vehicle 310 in a message 360 that is generated responsive to receipt of, and parameters determined in, a message 342 in a so-called "pull" model (e.g., where a message 360 is transmitted responsive to requests in messages 342 for an updated configuration periodically or responsive to particular events). In another embodiment, configuration builder 312 may provide an updated configuration for vehicle 310 in a message 360 that is implemented in a so-called "push" model (e.g., that does not require an explicit request in a message 342). To implement such a push model for delivery of an updated configuration, for example, configuration builder 312 may have a priori knowledge of, or immediate access to, all rules applicable to vehicle 310, namespaces that should be applicable to a VIN associated with vehicle 310, just to provide a few examples of a priori knowledge that may enable implementation of a push model for delivery of an updated configuration. In another aspect, a push delivery of an updated configuration may be implemented on a subscription model that uses MQTT messaging and is capable of obtaining non-VIN specific configurations based, at least in part, on a known VIN associated with vehicle 310. To ensure that a "pushed" delivery of update modules to a configuration are delivered and/or implemented, configuration builder 312 may wait a particular duration following transmission of a message 360 for an acknowledgement message (not shown) from vehicle 310. In the absence of receipt of such an acknowledgement message, configuration builder 312 may retransmit updates to a configuration in a subsequent message 360 and wait again for an acknowledgement message from vehicle 310 (e.g., in the event that the transmitted updated configuration was lost). In another aspect, a "retained message" feature of MQTT messaging may be implemented to ensure receipt of an updated configuration.

Figure 4:
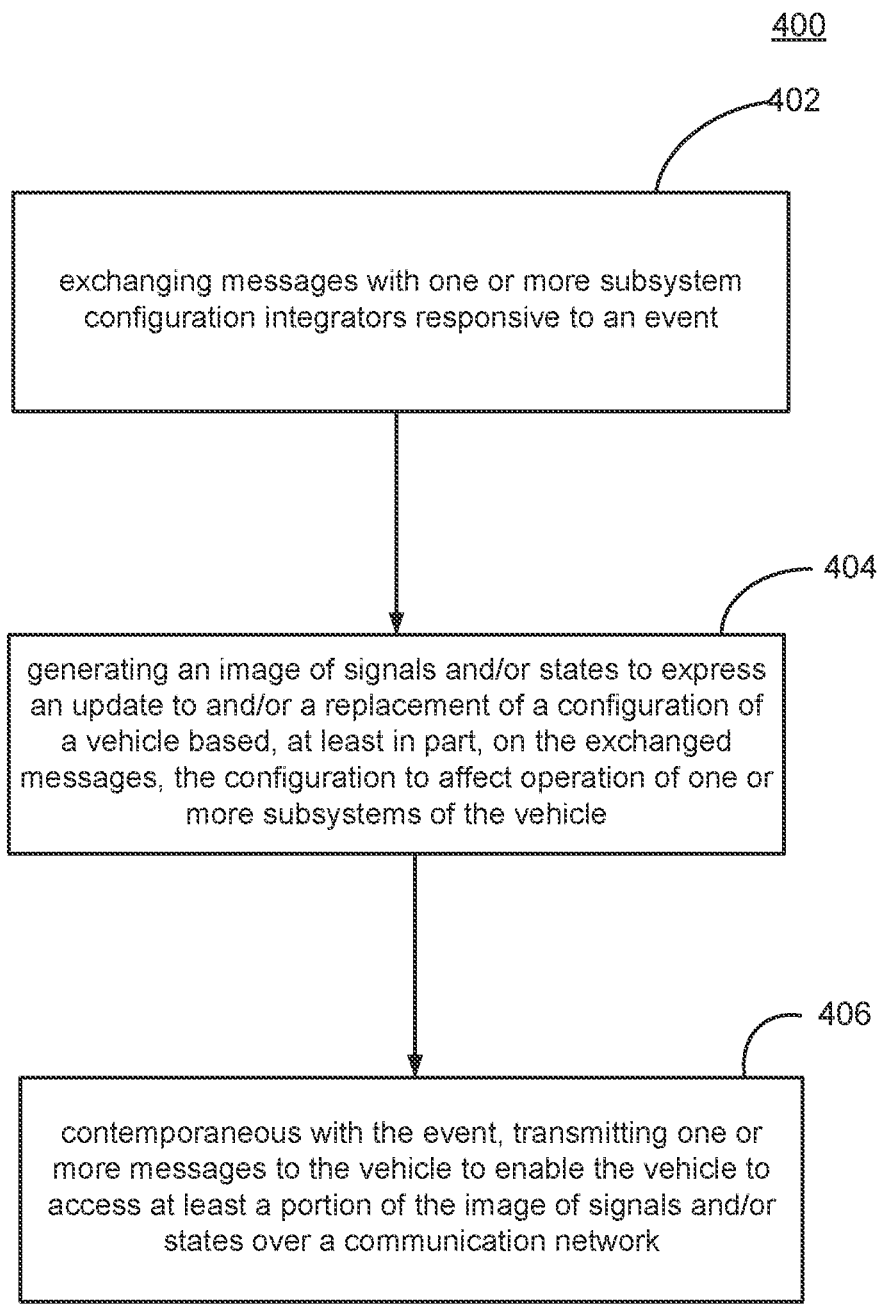
FIG. 4 is a flow diagram of a process to generate an updated vehicle configuration, according to an embodiment.

FIG. 4 is a flow diagram of a process 400 to define an updated vehicle configuration, according to an embodiment. In this context a "configuration" of a vehicle, as referred to herein, is to mean a collective state of adaptable/modifiable parameters that affect operation of at least one aspect of the vehicle. As pointed out above, such adaptable/modifiable parameters may comprise code (e.g., software/firmware routines), settings used by the code (e.g., control parameter values), and other content such as media content (e.g., image and/or audio content), just to provide a few examples. In an embodiment, the process 400 may be executed by the configuration builder 212/312, which may be implemented or executed by a computing system (e.g., a server). The configuration builder 212/312 in this context may act as a vehicle update configuration system. The process 400 may include blocks 402-406, also referred to as operations 402-406. As stated above, the configuration builder 212/312 may include one or more processors for performing the various operations of process 400, and may include a communication device for exchanging messages with various other systems via a communication network.

In an embodiment, block 402 may comprise an exchange of messages between a configuration builder (e.g., configuration builder 212 or 312) and one or more subsystem configuration subsystem configuration integrators (e.g., subsystem configuration integrators 214 or 314). Such an exchange of messages at block 402 may comprise, for example, one or more subsystem update request messages 344 followed by one or more subsystem update response messages 348. More particularly, the configuration builder or other computing system may communicate subsystem update request messages 344 to subsystem configuration integrators, and may receive subsystem update response messages 344 from the subsystem configuration integrators 344.

In an embodiment, the subsystem update request messages 344 may be for requesting one or more modules for an update to a subsystem configuration component of one or more associated subsystems of a vehicle (e.g., vehicle 210 or 310). As stated above, a subsystem configuration component may be a portion of content, such as code, settings or media content, which implement a configuration of a vehicle subsystem. A module in this example may be a package or other piece of updated content, such as updated code, updated settings and/or updated media content, that are used to update the content of the subsystem configuration component. In this example, the one or more subsystem update response messages 348 may be for providing the one or more requested modules. In a particular implementation, messages 344 may be based, at least in part, on key value pairs parsed from a namespace associated with a vehicle for which a configuration is to be updated.

In one implementation, the one or more processors of the configuration builder 212/312 may perform block 402 by communicating, via a communication device of the vehicle configuration update system, one or more subsystem update request messages (e.g., one or more messages 344) to one or more subsystem configuration integrators.

In an embodiment, the one or more subsystem update request messages may be communicated in response to an event, such as receipt of a vehicle configuration update request message from a vehicle 310. More particularly, the configuration builder 212/312 may receive such a message, which is for requesting a new vehicle configuration to be applied to the vehicle 310. This new vehicle configuration would be used to update or replace an existing vehicle configuration of the vehicle 310. In this example, block 402 may be performed in response to receiving the vehicle configuration update request message.

In an embodiment, the subsystem update request messages of block 402 may be transmitted or otherwise communicated to one or more computing devices operated by or associated with one or more subsystem configuration integrators. Each subsystem configuration integrator of the one or more subsystem configuration integrators may be an entity that manages and/or controls operation of a respective vehicle subsystem of multiple vehicle subsystems of a vehicle. The communicated one or more subsystem update request messages in block 402 may be for requesting content that updates operation of one or more vehicle subsystems of the multiple vehicle subsystems.

In an embodiment, block 402 may further comprise receiving, by the one or more processors from the computing devices operated by or associated with the one or more subsystem configuration integrators via the communication device, one or more subsystem update response messages. A subsystem update response message from a vehicle subsystem integrator may include content for updating operation of a vehicle subsystem associated with the integrator. For example, a subsystem update response message may include a subsystem update module. As stated above, such a module may be a piece of content (e.g., a package) that includes code or settings for updating operation of the vehicle subsystem.

In one particular implementation, an exchange of messages at block 402 may occur responsive to and/or be triggered by a specific event such as, receipt of a message 342 at configuration builder 312 in a "pull" model for delivery of configuration updates. In another particular implementation, an exchange of messages at block 402 may occur responsive to and/or be triggered by a scheduler that initiates delivery of configuration updates in a "push" model.

In an embodiment, the configuration builder 212/312 may query subsystem configuration integrators, or more specifically the computing devices associated therewith, regarding whether an update is needed for the configuration of a particular vehicle subsystem. For example, the vehicle configuration update message 342 may indicate what event or condition is triggering the requesting of a new vehicle configuration. In this example, the configuration builder 212/312 may communicate one or more update query messages to the one or more computing devices associated with the one or more subsystem configuration integrators. The update query messages may be associated with one or more of the multiple vehicle subsystems, and are used to query whether the event is to trigger the one or more vehicle subsystems to change their operation.

In the above example, the computing devices associated with the one or more subsystem configuration integrators may respond to the configuration builder 212/312 with one or more query response messages which indicate whether the event is to trigger the one or more vehicle subsystems to change their operation. For instance, a first subsystem configuration integrator may return a first response message which indicates that a particular event is to trigger an updated configuration that updates operation of a first vehicle subsystem, while a second subsystem configuration integrator may return a second response message which indicates that the event does not trigger an updated configuration for a second vehicle subsystem. Such response messages may be used by the configuration builder 212/312 to generate a configuration file in block 404.

Block 404 may comprise the configuration builder 212/312 generating a configuration file or other configuration information for causing a new configuration to be applied to the vehicle 310. In an embodiment, the configuration file may be a file image, which may be an image of signals and/or states that expresses an update to and/or replacement of a configuration of a vehicle based, at least in part, on messages exchanged at block 402. Such signals and/or states of such a generated image may be referred to herein as "configuration information" that is to cause an updated configuration or a replacement configuration to be applied to a vehicle.

In a particular implementation, block 404 may comprise configuration builder 212 or 312 generating the configuration file based on the one or more subsystem update modules received in block 402. For example, block 402 may involve integrating update modules received from multiple subsystem configuration integrators 214 or 314 to enable an update to a configuration of such a vehicle based, at least in part, on the exchanged message. In a particular implementation, integrated update modules (e.g., including configuration parameters associated with particular subsystem configurations) may be formatted and/or packaged for delivery to a vehicle to enable update of associated subsystems of the vehicle based, at least in part, on obtained configuration parameters from one or more subsystem configuration integrators 214 or 314.

According to an embodiment, block 404 may comprise generating, by one or more processors of a vehicle configuration update system, configuration information for causing an updated configuration or a replacement configuration to be applied to a vehicle. Block 404 may generate such configuration information based, at least in part, on one or more subsystem update response messages (e.g., one or more messages 348) from the one or more subsystem configuration integrators. Such an updated configuration or replacement configuration may control operation of the multiple vehicle subsystems.

In an embodiment, the configuration builder 312/212 may perform block 404 by determining whether there is a conflict between the multiple subsystem update modules included in the update response messages 348 of block 402. The configuration builder 212/312 may generate the configuration file in a manner that is based on whether there is conflict between the multiple subsystem modules.

Block 404 may further generate, by the one or more processors based on the configuration information, content for one or more configuration update messages (e.g., one or more messages 360) that include or reference the configuration file or other configuration information. In one particular implementation, such a configuration update message may reference an updated configuration or replacement configuration by, for example, providing a URI that is selectable for a download of one or more electronic files or electronic documents containing configuration information. In another particular implementation, such a configuration update message may reference an updated configuration or replacement configuration by, for example, transporting, encapsulating and/or attaching one or more electronic files or electronic documents containing configuration information. It should be understood, however, that this is merely an example of how a configuration update message may reference an updated configuration or replacement configuration, and claimed subject matter is not limited in this respect. In one example, block 404 may further generate configuration information based, at least in part, on an identity of a driver of the vehicle. In another example, block 404 may generate configuration information based, least in part, on a model, trim or year of the vehicle, or a combination thereof, determined based, at least in part, on parameters obtained from at least one update request message received from a vehicle.

In one embodiment, an update query message received at block 402 may comprise one or more key-value pairs and block 404 may further comprise: identifying subsystems of a vehicle based, at least in part, on the one or more key-value pairs; and generating the configuration information based, at least in part, on the identified subsystems of the vehicle. Block 404 may identify subsystems of a vehicle by parsing the one or more key-value pairs into segments associated with the subsystems and generating configuration information based, at least in part, on key-value pairs associated with the segments. In a particular implementation, block 404 may generate configuration information by exchanging messages with computing devices associated with the one or more subsystem configuration integrators to obtain configuration parameters of subsystems associated with the one or more subsystem configuration integrators; and integrating the obtained configuration parameters of the subsystems associated with the one or more subsystem configuration integrators provide the configuration information.

Block 406 may comprise initiating transmission of the one or more configuration update messages (e.g., one or more messages 360) to a vehicle to enable the vehicle to access the configuration file, which may be an image of signals and/or states containing modules enabling an update of the vehicle's configuration to a new vehicle configuration. According to an embodiment, a transmitter device may be coupled to a transmission medium and include circuitry to modulate a signal in the transmission medium based on information. Receiving the modulated signal, a receiver device coupled to the transmission medium may apply detection and/or demodulation operations to recover the information. In this context, a device may initiate transmission of a message by issuing a signal and/or command to a transmitter device to transmit the message over a transmission medium (e.g., by modulating a signal in the transmission medium based on the message). In one implementation, such messages transmitted at block 406 may transport all or a portion of an image of signals and/or states generated at block 404. In another implementation, such messages transmitted at block 406 may comprise one or more universal resource identifiers (URIs) accessible by a computing device co-located with the vehicle to direct the vehicle to download all or a portion of such an image of signals and/or states containing modules.

In a particular implementation, upon receipt of at least a portion of an image generated at block 404, a host and/or main ECU of a vehicle may execute one or more procedures to update subsystem configuration components of associated subsystems. Such an updated of subsystem configuration components of associated subsystems may be executed by, for example, refreshing signals and/or states stored in non-volatile memory devices to be accessible by ECUs controlling operation of the associated subsystems.

In an embodiment, the transmission of the configuration update messages to the vehicle at block 406 may be contemporaneous with an event that triggered the exchange of messages in block 402, or more particularly triggered the transmission of the subsystem update request messages to the subsystem configuration integrators. In one particular implementation, such an event may comprise receipt of a vehicle configuration update request message from the vehicle requesting an update to and/or replacement of the configuration of the vehicle. For example, such an update query message from the vehicle may be initiated responsive to an ignition event at the vehicle. In this context, "contemporaneous" as referred to herein is to mean a characterization of events and/or conditions that are to occur and/or to be present in roughly the same time period. For example, the transmission of the configuration update messages may occur within a predefined time period after the vehicle configuration update request message is received. The predefined time period may be, e.g., a predefined average time period for generating configuration information which updates a vehicle's configuration. In a particular implementation, transmission of one or more messages 360 at block 406 is to occur contemporaneously with an event initiating an exchange of messages by occurring without substantial delay following the event. For example, such a message may be transmitted at block 406 may occur within a drive time following an ignition event that initiates an exchange of messages at block 402. This may be enabled, at least in part, by interaction with multiple subsystem configuration integrators at block 402 to create an image for an update of a configuration at block 404 tailored to a specific vehicle (e.g., model, trim, year, geography) "on the fly," under specific contexts, conditions, etc. This may enable servicing a very large number of diverse configurations for a diverse fleet of vehicles without use of a database that statically stores an exhaustive collection of predefined configurations for any vehicle in the diverse fleet.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described. As such, the term "based on" is intended to convey at least a subset of factors and is to mean "based, at least in part, on."

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

Along these lines, a variety of techniques have come into use so that one or more measurements may be processed to better estimate an underlying deterministic component, as well as to estimate potentially random components. These techniques, of course, may vary with details surrounding a given situation.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture, but may include other aspects, such as the Hadoop distributed file system (HDFS). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long-haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames to transmit messages between and/or among network devices. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution. In other embodiments, network devices may exchange messages in signal packets using a Message Queuing Telemetry Transport (MQTT) protocol.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource indicator (URI) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, an image, a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters may comprise a model, trim, or year of a motor vehicle. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term "transmission" by itself is not intended, in the context of the present patent application, to have particular implications with respect to the one or more signals being communicated, such as, whether the signals are being communicated "to" a particular device, whether the signals are being communicated "from" a particular device, and/or regarding which end of a communication path may be initiating communication, such as, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, which may be substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like.

Figure 5:
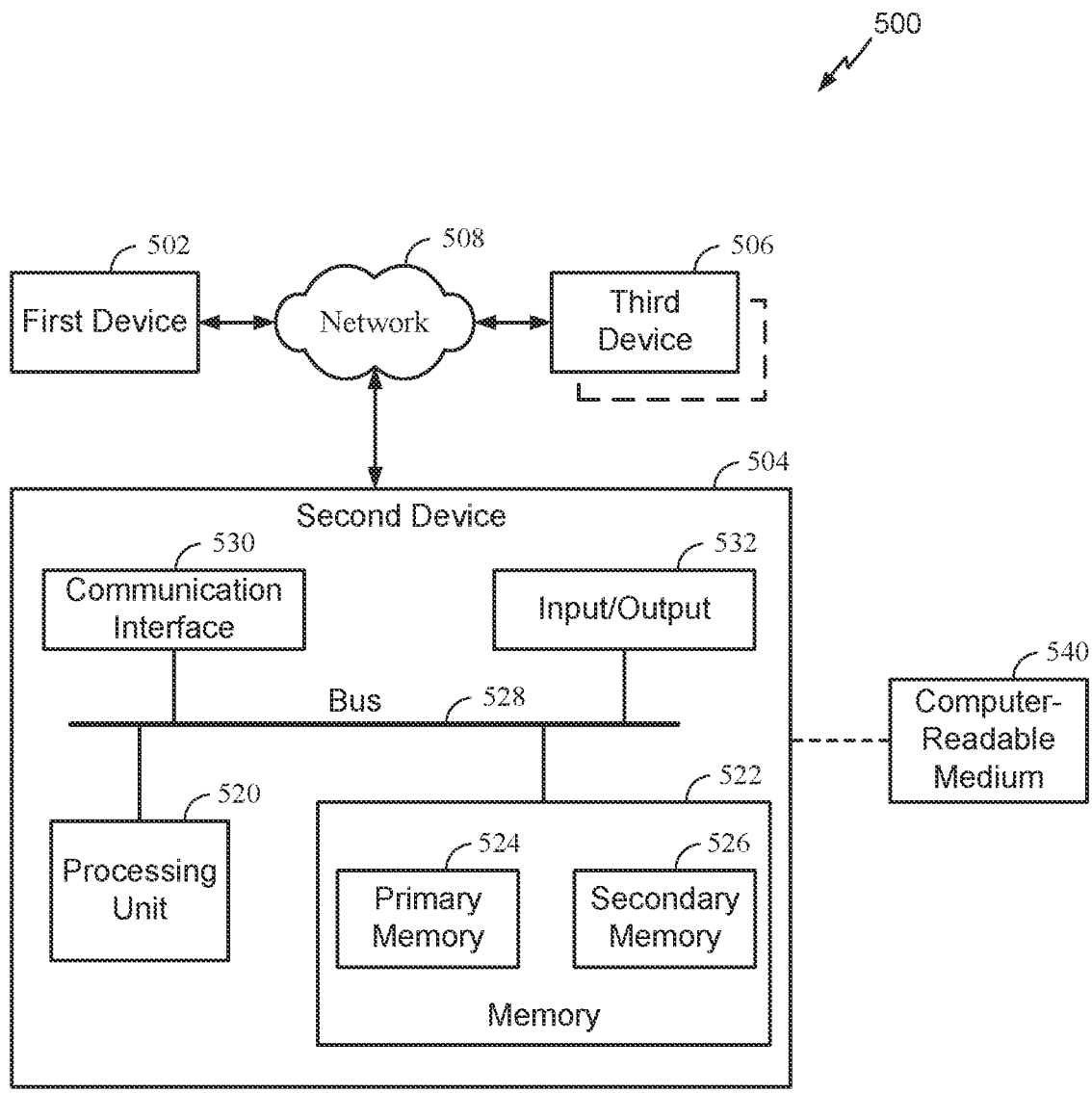
FIG. 5 is a schematic block diagram of an example computing system in accordance with an implementation.

In one example embodiment, as shown in FIG. 5, a system embodiment may comprise a local network (e.g., device 504 and medium 540) and/or another type of network, such as a computing and/or communications network. For purposes of illustration, therefore, FIG. 5 shows an embodiment 500 of a system that may be employed to implement either type or both types of networks. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. In other examples, a "processor" may connote other types of structures such as, a field programmable gate array (FPGA), application specific integrated circuit (ASIC), programmable logic controller (PLC) and/or the like. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 2, 3 and 4, and in the text associated with the foregoing figure(s) of the present patent application.

In FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 528, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 504, as depicted in FIG. 5, is merely one example, and claimed subject matter is not limited in scope to this particular example.

According to an embodiment, one or more features of computing device 504 may be implemented as a main and/or host ECU in a vehicle (e.g., vehicle 210 and/or 310) that is capable of exchanging messages with a configuration builder (e.g., configuration builder 212 and/or 312) over network 508. Here, such an implementation of a main and/or host ECU may execute one or more procedures to effect updates to a configuration of a vehicle based, at least in part, on an image of signals and/or states generated at block 404. In another embodiment, one or more features of computing device 504 may be implemented as a computing device of a configuration builder (e.g., configuration builder 212 and/or 312) that is capable of executing one or more aspects of process 400 and/or exchanging messages with one or more subsystem configuration integrators (e.g., subsystem integrator 214 and/or 314) or vehicles (e.g., vehicle 210 and/or 310) over network 508.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams or otherwise, may also be executed and/or affected, in whole or in part, by a computing device and/or a network device. A device, such as a computing device and/or network device, may vary in terms of capabilities and/or features.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX).

A computing device and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage medium. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may comprise a non-transitory storage medium to be utilized to store a program of executable computer-readable instructions. For example, processor 520 may fetch such executable computer-readable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a computer-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions (e.g. pursuant to program software instructions).

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, such a physical transformation may be brought about by a change of state including a change in amount of stored charge or a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 520 to process signals, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A vehicle configuration update system for managing vehicle configuration updates for a vehicle, the vehicle configuration update system comprising:
    a communication device configured to communicate via a communication network; and
    one or more processors in communication with the communication device and configured to:
        receive, from the vehicle, a vehicle configuration update request message, which is a message for requesting a new vehicle configuration to be applied to the vehicle, wherein the new vehicle configuration is to update or replace an existing vehicle configuration of the vehicle;
        communicate, via the communication device and in response to the vehicle configuration update request message, one or more subsystem update request messages to one or more computing devices operated by or associated with one or more subsystem configuration integrators, wherein each subsystem configuration integrator of the one or more subsystem configuration integrators is an entity that controls or manages operation of a respective vehicle subsystem of multiple vehicle subsystems of the vehicle, and wherein the one or more subsystem update request messages are for requesting content that updates operation of one or more vehicle subsystems of the multiple vehicle subsystems;
        receive, from the one or more computing devices operated by or associated with the one or more subsystem configuration integrators via the communication device, one or more subsystem update response messages, which are one or more messages for updating operation of the one or more vehicle subsystems, wherein the one or more subsystem update response messages include one or more subsystem update modules, respectively, wherein each of the one or more subsystem update modules is a respective piece of content that includes code or settings for updating operation a vehicle subsystem associated with the subsystem update module;

generate a configuration file for causing the new vehicle configuration to be applied to the vehicle, wherein the configuration file is generated based on the one or more subsystem update modules, and wherein the configuration file is for controlling operation of the multiple vehicle subsystems;

generate, based on the configuration file, one or more configuration update messages that include or reference the configuration file; and initiate transmission of the one or more configuration update messages via the communication device to the vehicle over the communication network to enable the vehicle to access the configuration file and to operate with the new vehicle configuration.

2. The vehicle configuration update system of claim 1, wherein the one or more processors are configured to receive multiple subsystem update modules, and to determine whether there is a conflict between the multiple subsystem update modules, and wherein the one or more processors are configured to generate the configuration file in a manner that is based on whether there is conflict between the multiple subsystem update modules.

3. The vehicle configuration update system of claim 1, wherein the vehicle configuration update request message indicates an event or condition that is triggering the requesting of the new vehicle configuration, wherein the one or more processors are configured, in response to receiving the vehicle configuration update request message, to communicate one or more update query messages to the one or more computing devices operated by or associated with the one or more subsystem configuration integrators, wherein the one or more update query messages are associated with one or more of the multiple vehicle subsystems, and are for querying whether the event is to trigger the one or more vehicle subsystems to change their operation.

4. The vehicle configuration update system of claim 3, wherein the one or more processors are configured to receive one or more query response messages from the one or more computing devices operated by or associated with the one or more subsystem configuration integrators, wherein the one or more query response messages are for indicating whether the event or condition is to trigger the one or more vehicle subsystems to change their operation, wherein the configuration file or the one or more subsystem update request messages are generated based on the one or more query response messages.

5. The vehicle configuration update system of claim 1, wherein the vehicle configuration update request message from the vehicle is received responsive to an ignition event at the vehicle.

6. The vehicle configuration update system of claim 5, wherein the configuration file is generated based on an identity of a driver of the vehicle.

7. The vehicle configuration update system of claim 5, wherein the configuration file is generated based, least in part, on a model, trim, or year of the vehicle, or a combination thereof, and wherein the one or more processors are configured to receive, from the vehicle via the communication device, one or more vehicle description messages that include parameters which are indicative of attributes of the vehicle, and are configured to determine the model, trim, or year of the vehicle from the parameters of the one or more vehicle description messages.

8. The vehicle configuration update system of claim 1, wherein the one or more processors are configured to initiate the transmission of the one or more configuration update messages contemporaneously with receipt of the vehicle configuration update request message.

9. A method performed by a computing system, the method comprising:

receiving, from a vehicle via a communication device, a vehicle configuration update request message, which is a message for requesting a new vehicle configuration to be applied to the vehicle, wherein the new vehicle configuration is to update or replace an existing vehicle configuration of the vehicle;

communicating, by one or more processors via the communication device of a vehicle configuration update system and in response to the vehicle configuration update request message, one or more subsystem update request messages to one or more computing devices operated by or associated with one or more subsystem configuration integrators, wherein each subsystem configuration integrator of the one or more subsystem configuration integrators is an entity that controls or manages operation of a respective vehicle subsystem of multiple vehicle subsystems of a vehicle, and wherein the one or more subsystem update request messages are for requesting content that updates operation of one or more vehicle subsystems of the multiple vehicle subsystems;

receiving, by the one or more processors from the one or more subsystem configuration integrators via the communication device, one or more subsystem update response messages, which are one or more messages for updating operation of the one or more vehicle subsystems, wherein the one or more subsystem update response messages include one or more subsystem update modules, respectively, wherein each of the one or more subsystem update modules is a respective piece of content that includes code or settings for updating operation a vehicle subsystem associated with the subsystem update module;

generating, by the one or more processors, a configuration file for causing an updated configuration or a replacement configuration to be applied to the vehicle, wherein the configuration file is generated based on the one or more subsystem update modules, and wherein the configuration file is for controlling operation of the multiple vehicle subsystems;

generating, by the one or more processors based on the configuration file, one or more configuration update messages that include or reference the configuration file; and initiating transmission, by the one or more processors via the communication device, the one or more configuration update messages to the vehicle over a communication network to enable the vehicle to access the configuration file and to operate with the new vehicle configuration.

10. The method of claim 9, wherein the vehicle configuration update request message indicates an event or condition that is triggering the requesting of the new vehicle configuration,
wherein the method further comprises communicating, in response to receiving the vehicle configuration update request message, one or more update query messages to the one or more computing devices operated by or associated with the one or more subsystem configuration integrators,
wherein the one or more update query messages are associated with one or more of the multiple vehicle subsystems, and are for querying whether the event or condition is to trigger the one or more vehicle subsystems to change their operation.

11. The method of claim 9, wherein the vehicle configuration update request message from the vehicle is initiated responsive to an ignition event at the vehicle.

12. The method of claim 11, wherein the configuration file is generated based on an identity of a driver of the vehicle.

13. The method of claim 9, wherein the configuration file is generated based, least in part, on a model, trim, or year of the vehicle, or a combination thereof, determined based on parameters obtained from at least one message received from the vehicle.

14. The method of claim 9, wherein the one or more processors are configured to receive one or more key-value pairs from the communication network and wherein generating the configuration file further comprises:
identifying one or more vehicle subsystems based on the one or more key-value pairs; and
generating the configuration file based on the identified one or more vehicle subsystems.

15. The method of claim 14, wherein identifying the one or more vehicle subsystems further comprises:
parsing the one or more key-value pairs into segments associated with the vehicle subsystems; and
generating the configuration file based on key-value pairs associated with the segments.

16. The method of claim 14, wherein generating the configuration file further comprises:
exchanging messages with the one or more computing devices operated by or associated with the one or more subsystem configuration integrators to obtain configuration parameters of vehicle subsystems associated with the one or more subsystem configuration integrators; and
integrating the obtained configuration parameters of the vehicle subsystems associated with the one or more subsystem configuration integrators to provide the configuration file.

17. The method of claim 9, wherein at least one of the transmitted one or more configuration update messages comprises one or more universal resource identifiers accessible by a computing device co-located with the vehicle to obtain the at least a portion of the configuration file.

18. The method of claim 9, wherein operation of at least one of the one or more vehicle subsystems are controllable by one or more associated electronic control units (ECUs), and wherein the generated configuration file comprises computer-readable instructions that are executable by at least one of the one or more associated ECUs.

19. The method of claim 9, wherein at least a portion of the configuration file comprises image and/or audio content.

20. An article comprising:
a non-transitory storage medium comprising computer-readable instructions stored thereon, which are executable by one or more processors of a computing system to:
receive, from a vehicle via a communication network and a communication device, a vehicle configuration update request message, which is a message for requesting a new vehicle configuration to be applied to the vehicle, wherein the new vehicle configuration is to update or replace an existing vehicle configuration of the vehicle;
communicate, via a communication network and a communication device, and in response to the vehicle configuration update request message, one or more update request messages to one or more computing devices operated by or associated with one or more subsystem configuration integrators, wherein each subsystem configuration integrator of the one or more subsystem configuration integrators is an entity that controls or manages a respective vehicle subsystem of multiple vehicle subsystems of a vehicle, and wherein the one or more update request messages are for requesting content that updates operation of one or more vehicle subsystems of the multiple vehicle subsystems;
receive, from the one or more computing devices operated by or associated with the one or more subsystem configuration integrators via the communication device, one or more subsystem update response messages, which are one or more messages for updating operation of the one or more vehicle subsystems, wherein the one or more subsystem update response messages include one or more subsystem update modules, respectively, wherein each of the one or more subsystem update modules is a respective piece of content that includes code or settings for updating operation a vehicle subsystem associated with the subsystem update module;
generate a configuration file to cause the new vehicle configuration to be applied to the vehicle, wherein the configuration file is generated based on the one or more subsystem update modules, and wherein the configuration file is to control operation of the multiple vehicle subsystems;
generate, based on the configuration file, one or more configuration update messages that include or reference the configuration file; and
initiate transmission of the one or more configuration update messages via the communication device to the vehicle over the communication network to enable the vehicle to access the configuration file and to operate with the new vehicle configuration.

* * * * *